US012590617B2

(12) United States Patent
An et al.

(10) Patent No.: US 12,590,617 B2
(45) Date of Patent: Mar. 31, 2026

(54) VIBRATION ISOLATION DEVICE

(71) Applicant: Prospira Corporation, Kawasaki city (JP)

(72) Inventors: Zhixu An, Kawasaki city (JP); Yoshichika Okajima, Kawasaki city (JP)

(73) Assignee: Prospira Corporation, Kawasaki city (JP)

( * ) Notice: Subject to any disclaimer, the term of this patent is extended or adjusted under 35 U.S.C. 154(b) by 412 days.

(21) Appl. No.: 18/559,566

(22) PCT Filed: Jan. 18, 2022

(86) PCT No.: PCT/JP2022/001604
§ 371 (c)(1),
(2) Date: Nov. 8, 2023

(87) PCT Pub. No.: WO2022/239302
PCT Pub. Date: Nov. 17, 2022

(65) Prior Publication Data
US 2024/0229895 A1     Jul. 11, 2024

(30) Foreign Application Priority Data

May 11, 2021     (JP) ................................. 2021-080333

(51) Int. Cl.
F16F 1/38          (2006.01)
(52) U.S. Cl.
CPC .......... F16F 1/3828 (2013.01); F16F 1/3814 (2013.01); F16F 1/3842 (2013.01); F16F 1/3849 (2013.01); *F16F 2230/0005* (2013.01)
(58) Field of Classification Search
CPC ...... F16F 1/3842; F16F 1/3849; F16F 1/3828; F16F 1/3814

(Continued)

(56) References Cited

U.S. PATENT DOCUMENTS 5,295,653 A * 3/1994 Miyazaki ............... B21D 53/00
                                                          267/141.2
5,718,407 A * 2/1998 Lee ....................... F16F 1/3842
                                                          180/312

(Continued)

FOREIGN PATENT DOCUMENTS

EP          984192 A1 * 3/2000 ................ F16F 1/38
FR          2815579 A1 * 4/2002 ........... F16F 1/3842

(Continued)

OTHER PUBLICATIONS

Apr. 5, 2022, International Search Report issued in the International Patent Application No. PCT/JP2022/001604.

(Continued)

*Primary Examiner* — Devon C Kramer
(74) *Attorney, Agent, or Firm* — KENJA IP LAW PC

(57)          ABSTRACT

In this vibration isolation device, an elastic stopper (30) between a first attachment member (11) and a second attachment member (12) includes a first stopper portion (31) including a pair of stopper walls (31*a*) and a second stopper portion (32). The stopper walls are linked in a first direction by the second stopper portion and a linking portion (33) extending in the first direction. The first stopper portion, the second stopper portion, and the linking portion are formed as one part. The first attachment member includes a pair of restriction portions (35, 39) that engage with the linking portion and at least one of the first stopper portion and the second stopper portion, and restrict the first stopper portion and the linking portion from approaching each other in a third direction. Portions (31*b*) of the first stopper portion connecting to the linking portion are tensioned in the third direction.

8 Claims, 6 Drawing Sheets

(58) Field of Classification Search
USPC .................................................... 267/140.12
See application file for complete search history.

(56)                References Cited

U.S. PATENT DOCUMENTS

| | | | | |
|---|---|---|---|---|
| 2008/0315473 | A1* | 12/2008 | Nishimae ................ | F16F 13/04 267/140.11 |
| 2009/0152780 | A1* | 6/2009 | Troyke ..................... | F16F 1/52 29/896.93 |
| 2009/0315235 | A1* | 12/2009 | Rodecker .............. | F16F 1/3849 267/294 |
| 2012/0112395 | A1* | 5/2012 | Mizobe ................. | F16F 1/3873 267/139 |
| 2013/0134641 | A1* | 5/2013 | Yanagi .................. | F16F 1/3828 267/141.2 |
| 2014/0084526 | A1 | 3/2014 | Watanabe | |
| 2015/0240908 | A1* | 8/2015 | Pizanti ..................... | F16C 7/04 248/634 |
| 2016/0201756 | A1* | 7/2016 | Sakamoto ............ | B60K 5/1208 248/634 |
| 2020/0072315 | A1* | 3/2020 | Seno ....................... | F16F 15/08 |
| 2021/0356014 | A1* | 11/2021 | Purreiter ............... | F16F 1/3828 |
| 2023/0375062 | A1* | 11/2023 | Furumachi ........... | F16F 1/3849 |

FOREIGN PATENT DOCUMENTS

| | | | | |
|---|---|---|---|---|
| JP | H0694062 A | | 4/1994 | |
| JP | H07158696 A | | 6/1995 | |
| JP | 2005315315 A | * | 11/2005 | ........... F16F 1/3849 |
| JP | 2008248947 A | | 10/2008 | |
| JP | 2009014080 A | | 1/2009 | |
| JP | 2014066334 A | | 4/2014 | |
| JP | 2020180690 A | | 11/2020 | |
| JP | 2021089052 A | * | 6/2021 | ........... F16F 1/3849 |
| KR | 1020040016310 A | | 2/2004 | |

OTHER PUBLICATIONS

Nov. 14, 2023, International Preliminary Report on Patentability issued in the International Patent Application No. PCT/JP2022/001604.
Apr. 7, 2025, search result of the Extended European Search Report issued by the European Patent Office in the corresponding European Patent Application No. 22807009.0.

* cited by examiner

VIBRATION ISOLATION DEVICE

TECHNICAL FIELD

The present disclosure relates to a vibration isolation device.

The present application claims priority to and the benefit of Japanese Patent Application No. 2021-080333 filed May 11, 2021, the entire contents of which are incorporated herein by reference.

BACKGROUND

Conventionally, a known vibration isolation device includes: a first attachment member attached to either a vibration generator or a vibration receiver; a second attachment member attached to the other of the vibration generator and the vibration receiver; an outer cylinder attached to the first attachment member; an inner member attached to the second attachment member; and an elastic body linking the outer cylinder and the inner member to each other. The second attachment member comprises a pair of first walls covering the first attachment member from both sides in a first direction. An elastic stopper attached to the first attachment member is between the first attachment member and the second attachment member. The elastic stopper includes a pair of stopper walls, one between the first attachment member and one of the first walls, the other between the first attachment member and the other of the first walls.

CITATION LIST

Patent Literature

Patent Literature 1: JP 2014-66334 A

SUMMARY

Technical Problem

According to the conventional vibration isolation device, when the stopper walls are not adhered to the first attachment member, the elastic stopper may shift position relative to the first attachment member when assembled into a vehicle, for example.

Further, providing additional stopper portions corresponding to other directions different from the first direction in which the pair of the first walls face each other is difficult without increasing the number of parts.

In view of the situation described, it would be helpful to provide a vibration isolation device able to accommodate multiple vibration input directions while minimizing an increase in the number of parts, and that is able to suppress misalignment of the elastic stopper with respect to the first attachment member even without adhesion.

Solution to Problem

A vibration isolation device according to a first aspect of the present disclosure comprises: a first attachment member attached to either a vibration generator or a vibration receiver; a second attachment member attached to the other of the vibration generator and the vibration receiver; an outer cylinder attached to the first attachment member; an inner cylinder attached to the second attachment member and inserted inside the outer cylinder; an elastic body linking the inner circumferential surface of the outer cylinder and the outer circumferential surface of the inner cylinder to each other; and an elastic stopper between the first attachment member and the second attachment member, wherein the second attachment member comprises a pair of first walls covering the first attachment member from both sides in a first direction, and a second wall linking the pair the of first walls and covering the first attachment member in a second direction that intersects the first direction, the elastic stopper comprising: a first stopper portion that comprises a pair of stopper walls, one between the first attachment member and one of the first walls, and the other between the first attachment member and the other of the first walls; and a second stopper portion between the second wall and the first attachment member, wherein the stopper walls are linked in the first direction by the second stopper portion and a linking portion extending in the first direction, the linking portion is spaced away from the second stopper portion in a third direction that intersects the first direction and the second direction, the first stopper portion, the second stopper portion, and the linking portion are one integrated part, the first attachment member is provided with a pair of restriction portions configured to engage with the linking portion and at least one of the first stopper portion and the second stopper portion, and restrict the first stopper portion and the linking portion from approaching each other in the third direction, and portions of the first stopper portion connecting to the linking portion are tensioned in the third direction.

Advantageous Effect

According to the present disclosure, multiple vibration input directions may be accommodated while minimizing an increase in the number of parts, and misalignment of the elastic stopper with respect to the first attachment member may be suppressed even without adhesion.

DETAILED DESCRIPTION

Figure 1:
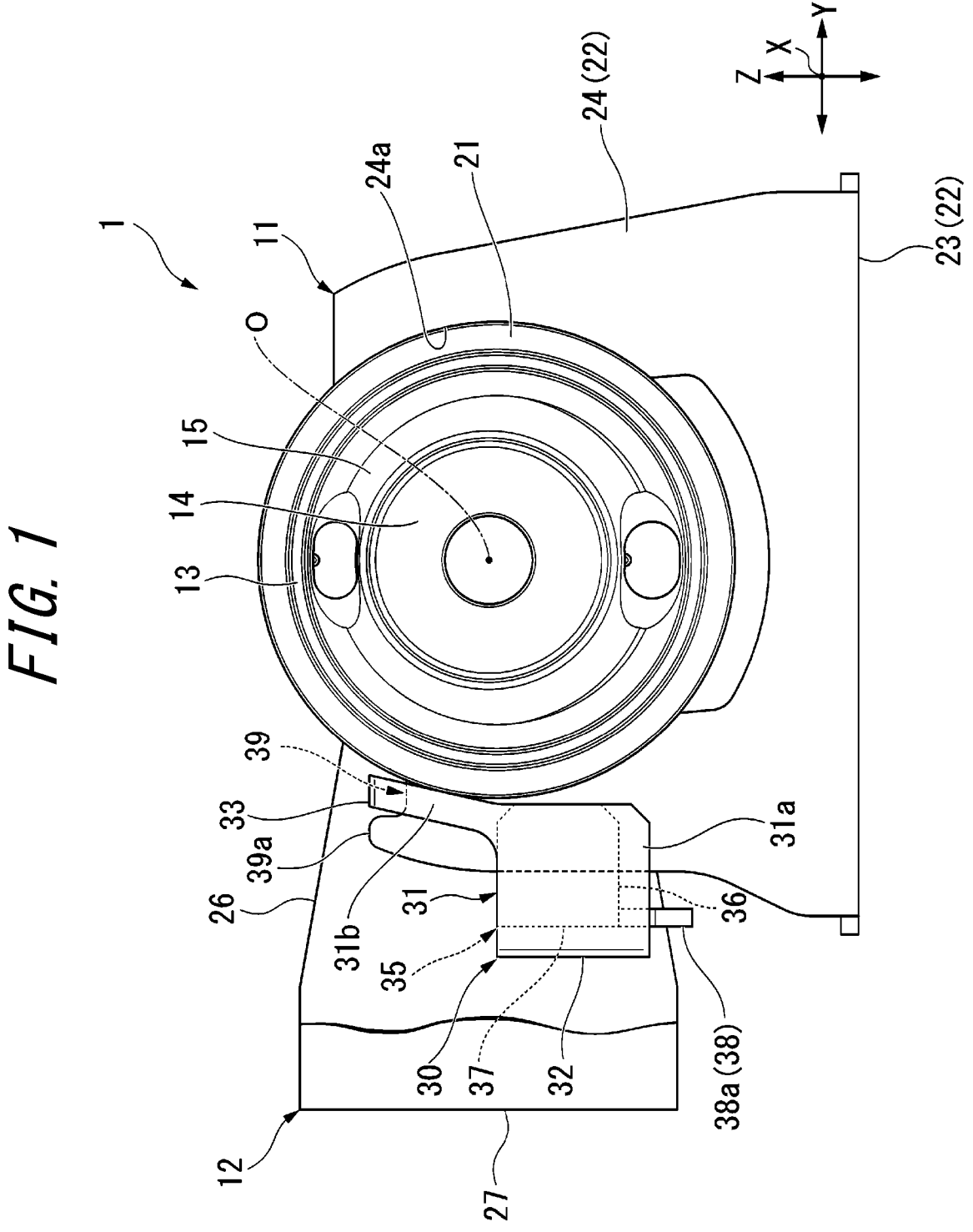
FIG. 1 is a side view of a vibration isolation device according to a first embodiment, viewed from a first direction.
Figure 2:
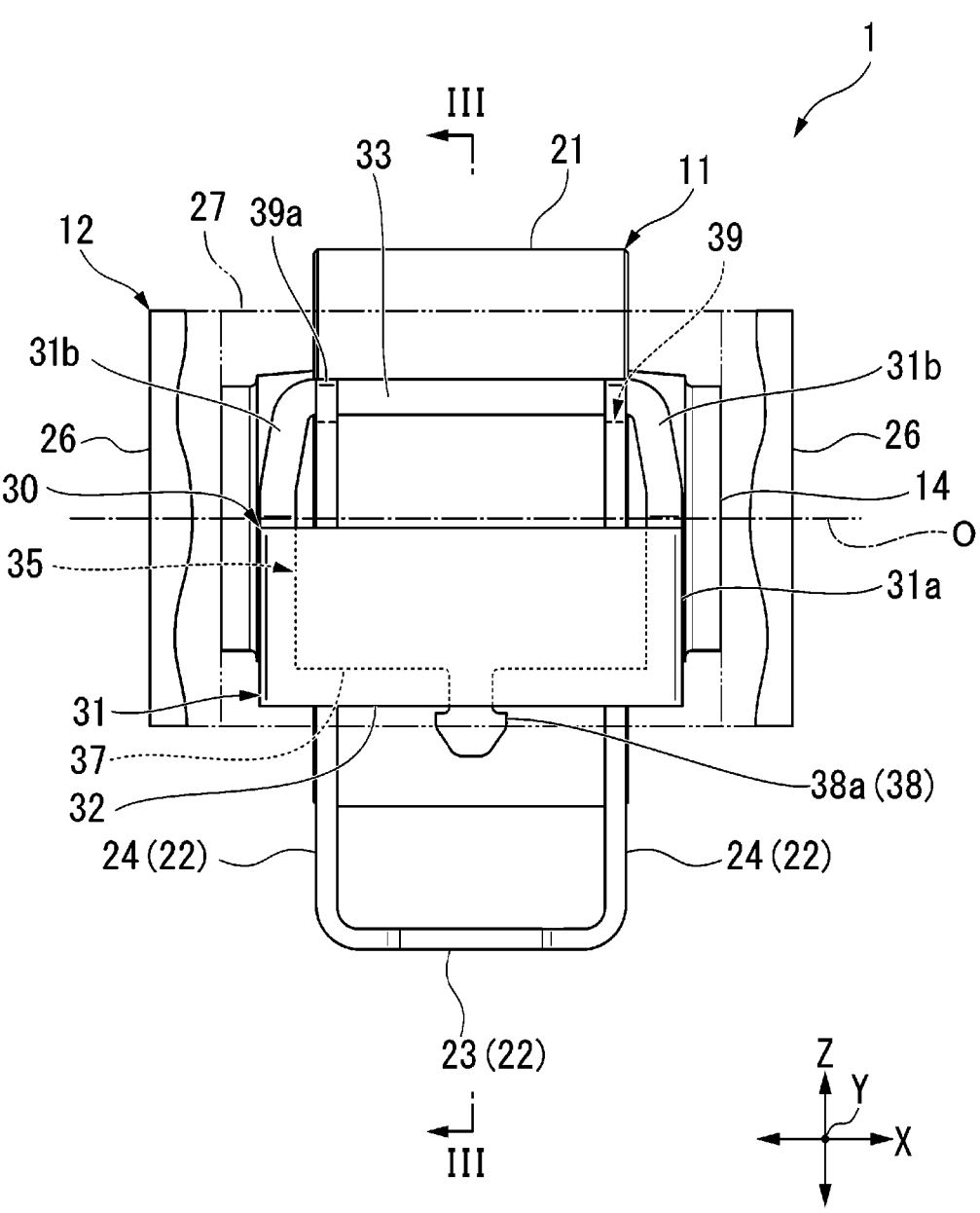
FIG. 2 is a side view of the vibration isolation device illustrated in FIG. 1, viewed from a second direction.

A first embodiment of the vibration isolation device is described below with reference to FIG. 1 through FIG. 3. A vibration isolation device 1 includes: a first attachment member 11 attached to either a vibration generator or a vibration receiver; a second attachment member 12 attached to the other of the vibration generator and the vibration receiver; an outer cylinder 13 attached to the first attachment member 11; an inner cylinder 14 attached to the second attachment member 12 and inserted inside the outer cylinder 13; and an elastic body 15 linking the inner circumferential surface of the outer cylinder 13 and the outer circumferential surface of the inner cylinder 14 to each other.

The vibration isolation device 1 is installed in an automobile, for example, to suppress the transmission of engine vibration to the vehicle body. According to this example of the vibration isolation device 1, the second attachment member 12 is attached to an engine, not illustrated, as the vibration generator, and the first attachment member 11 is attached to the vehicle body as the vibration receiver. The first attachment member 11 and the second attachment member 12 may be respectively attached to the vibration generator or the vibration receiver.

The first attachment member 11 includes a mounting cylinder 21 and a base 22.

The base 22 includes a seat plate 23 and two support plates 24.

The seat plate 23 is fixed to either the vibration generator or the vibration receiver. The support plates 24 protrude from the seat plate 23. The two support plates 24 are oriented with front and back surfaces facing each other.

Hereinafter, the direction in which the support plates 24 protrude from the seat plate 23 is referred to as upward, and the opposite direction is referred to as downward. The direction in which the two support plates 24 face each other is called a first direction X.

The support plates 24 each have a mounting hole 24a that opens upward. The mounting holes 24a penetrate the support plates 24 in the first direction X. The mounting cylinder 21 is fitted to and secured in the mounting hole 24a. The mounting cylinder 21 is joined to the support plates 24. The mounting cylinder 21 links the two support plates 24 in the first direction X. The upper end of the mounting cylinder 21 protrudes upward from the upper edges of the support plates 24. The outer cylinder 13 is fitted to and secured inside the mounting cylinder 21.

The outer cylinder 13 and the inner cylinder 14 are arranged coaxially and have a common axis O. The common axis O extends in the first direction X. The common axis O may extend in a direction that intersects the first direction X. Both ends of the inner cylinder 14 in the first direction X project from the outer cylinder 13 in the first direction X.

The second attachment member 12 includes a pair of first walls 26 covering the first attachment member 11 from both sides in the first direction X, and a second wall 27 linking the pair of the first walls 26 and covering the first attachment member 11 in a second direction Y that intersects the first direction X.

The first walls 26 are each linked to different ends of the inner cylinder 14 in the first direction X.

The second wall 27 is spaced apart from the support plate 24 in the second direction Y. The second wall 27 links ends in the second direction Y of the first walls 26. The second direction Y is perpendicular to the first direction X and the vertical direction.

The vertical direction is hereinafter also referred to as a third direction Z.

An elastic stopper 30 is provided between the first attachment member 11 and the second attachment member 12. The elastic stopper 30 includes a first stopper portion 31 and a second stopper portion 32.

The first stopper portion 31 includes a pair of stopper walls 31a, one between the first attachment member 11 and one of the first walls 26 and the other between the first attachment member 11 and the other of the first walls 26. The front and back surfaces of the stopper walls 31a face the first direction X. The first stopper portion 31 includes columns 31b protruding upward from the stopper walls 31a.

The stopper walls 31a are linked in the first direction X by the second stopper portion 32 and a linking portion 33 extending in the first direction X.

The second stopper portion 32 is between the second wall 27 and the first attachment member 11. The second stopper portion 32 is plate-shaped, and the front and back surfaces of the second stopper portion 32 face the second direction Y.

The linking portion 33 is spaced away from the second stopper portion 32 in the third direction Z, which intersects the first direction X and the second direction Y. The linking portion 33 links the upper ends of the columns 31b of the first stopper portion 31 to each other in the first direction X. The columns 31b are portions of the first stopper portion 31 connecting with the linking portion 33.

Figure 3:
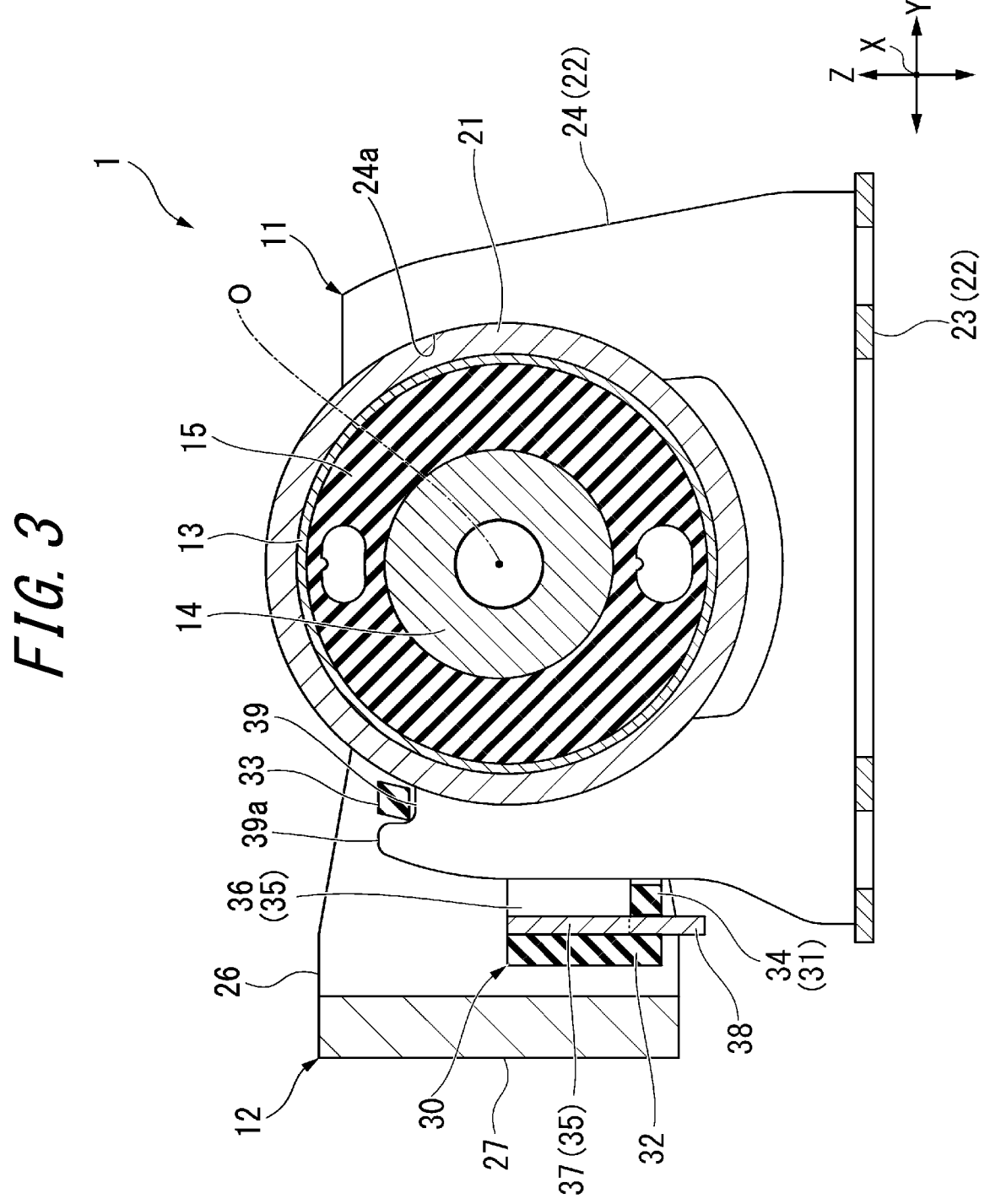
FIG. 3 is a view of a cross section indicated by the III-III line in FIG. 2.

Here, the first stopper portion 31 includes a bridging wall 34 linking the stopper walls 31a in the first direction X, as illustrated in FIG. 3. The bridging wall 34 links the lower ends of the stopper walls 31a to each other in the first direction X. The bridging wall 34 is also connected to the lower end of the second stopper portion 32. The bridging wall 34 is in direct contact with or close proximity to the support plates 24 of the first attachment member 11 in the Y direction. The bridging wall 34 is formed in the shape of a plate with the front and back surfaces facing the third direction Z.

The first stopper portion 31, the second stopper portion 32, and the linking portion 33 are formed as an integrated part from a rubber material, for example.

According to the present embodiment, the first attachment member 11 is provided with a pair of restriction portions that engage with the linking portion 33 and at least one of the first stopper portion 31 and the second stopper portion 32, and restrict the first stopper portion 31 and the linking portion 33 from approaching each other in the third direction Z. The columns 31b of the first stopper portion 31 are tensioned in the third direction Z by the pair of the restriction portions.

Of the pair of the restriction portions, a first restriction portion 35 engages with at least one of the first stopper portion 31 and the second stopper portion 32. The first restriction portion 35 links the support plates 24 in the first direction X.

The first restriction portion 35 is disposed below the common axis O. The first restriction portion 35 includes a pair of third walls 36 each protruding from a different one of the support plates 24 on an opposite side from the mounting holes 24a along the second direction Y. The first restriction portion 35 also includes a fourth wall 37 linking the third walls 36 to each other in the first direction X.

Hereinafter, a side viewed from the first direction X away from the common axis O along the second direction Y is referred to as the second direction Y "outside", and a side viewed from the first direction X closer to the common axis O along the second direction Y is referred to as the second direction Y "inside".

The front and back surfaces of the third walls 36 face the first direction X. Of the front and back surfaces of each of the third walls 36, surfaces opposite the surfaces that face each other, hereinafter also referred to as opposite surfaces of the third walls 36, are entirely covered in the first direction X by the stopper walls 31a. The opposite surfaces of the third walls 36 are in direct contact with or close proximity to the stopper walls 31a. The columns 31b are provided to second direction Y inside ends of the stopper walls 31a.

The front and back surfaces of the fourth wall 37 face the second direction Y. The fourth wall 37 links second direction Y outside ends of the third walls 36. The fourth wall 37 is spaced apart from second direction Y outsides of the support plates 24. Of the front and back surfaces of the fourth wall 37, the second direction Y outside surface is entirely covered in the second direction Y by the second stopper portion 32. Of the front and back surfaces of the fourth wall 37, the second direction Y outside surface is in direct contact with or close proximity to the second stopper portion 32. The second stopper portion 32 links the second direction Y outside ends of the pair of the stopper walls 31*a*.

The bottom edges of the third walls 36 and the fourth wall 37, respectively, are in direct contact with or close proximity to the top surface of the bridging wall 34. As a result, the first restriction portion 35 engages with both the first stopper portion 31 and the second stopper portion 32, and restricts upward movement of the first stopper portion 31 and the second stopper portion 32.

Of the pair of the restriction portions, a second restriction portion 39 engages with the linking portion 33. The second restriction portion 39 is part of an upper edge of the support plates 24. The second restriction portion 39 is disposed above the common axis O. The lower surface of the linking portion 33 is engaged with the upper edge of the support plates 24. The second restriction portion 39 thereby engages with the linking portion 33 and restricts downward movement of the linking portion 33.

The second restriction portion 39 includes an engagement protrusion 39*a* protruding upward from the upper edge of the support plates 24. The second restriction portion 39 does not need to include the engagement protrusion 39*a*. The engagement protrusion 39*a* is spaced away from a second direction Y outside of the mounting holes 24*a* formed in the support plates 24. A gap in the second direction Y is provided between the engagement protrusion 39*a* and the outer circumferential surface of the mounting cylinder 21. The linking portion 33 is inserted into this gap, and the linking portion 33 is in direct contact with or close proximity to the engagement protrusion 39*a* and the outer circumferential surface of the mounting cylinder 21. Accordingly, the second restriction portion 39 restricts movement of the linking portion 33 away from the first attachment member 11 in the second direction Y (second direction Y outside direction).

Here, the first restriction portion 35 includes a snap-fit protrusion 38 protruding in the third direction Z and penetrating at least one of the first stopper portion 31 and the second stopper portion 32 in the third direction Z. A tip of the snap-fit protrusion 38 protruding in the third direction Z from at least one of the first stopper portion 31 and the second stopper portion 32 engages with and restricts movement in the third direction Z of at least one of the first stopper portion 31 and the second stopper portion 32.

In the illustrated example, the snap-fit protrusion 38 protrudes downward from the bottom edge of the fourth wall 37 and penetrates the bridging wall 34 of the first stopper portion 31 in the third direction Z. The snap-fit protrusion 38 may penetrate the second stopper portion 32 in the third direction Z.

A jutting protrusion 38*a* jutting out in the first direction X is formed at the tip of the snap-fit protrusion 38 that protrudes downward from the bridging wall 34. The jutting protrusion 38*a* is in direct contact with or close proximity to the lower surface of the bridging wall 34. The jutting protrusion 38*a* may be formed at the tip of the snap-fit protrusion 38 by jutting out in the second direction Y or the like.

From the above, the snap-fit protrusion 38 penetrates the bridging wall 34 in the third direction Z, and therefore the snap-fit protrusion 38 is in direct contact or close proximity with the inner surface of a through-hole formed in the bridging wall 34 in the second direction Y.

Accordingly, the first restriction portion 35 is in direct contact with or close proximity to at least one of the first stopper portion 31 and the second stopper portion 32 in the second direction Y, and restricts movement of at least one of the first stopper portion 31 and the second stopper portion 32 away from the first attachment member 11 in the second direction Y (the second direction Y outside direction).

As explained above, according to the vibration isolation device 1, the elastic stopper 30 includes the first stopper portion 31 and the second stopper portion 32. Therefore, when vibrations are input to the vibration isolation device 1 in the first direction X and the second direction Y, respectively, the elastic stopper 30 may collide with the second attachment member 12, allowing just one of the elastic stopper 30 to accommodate multiple vibration input directions.

The first attachment member 11 is provided with the first restriction portion 35 and the second restriction portion 39 that engage with the linking portion 33 and at least one of the first stopper portion 31 and the second stopper portion 32, and restrict the first stopper portion 31 and the linking portion 33 from approaching each other in the third direction Z. The columns 31*b* of the first stopper portion 31 are tensioned in the third direction Z.

Therefore, the elastic stopper 30 may be tightened to the first attachment member 11 in the third direction Z. Even without adhering the elastic stopper 30 to the first attachment member 11, misalignment of the elastic stopper 30 with the first attachment member 11 may be suppressed when assembling into a vehicle, for example.

The first stopper portion 31, the second stopper portion 32, and the linking portion 33 are formed as one integrated part, avoiding an increase in the number of parts.

The first restriction portion 35 is in direct contact with or close proximity to at least one of the first stopper portion 31 and the second stopper portion 32 in the second direction Y, and the second restriction portion 39 is in direct contact with or close proximity to the linking portion 33 in the second direction Y. The first restriction portion 35 and the second restriction portion 39 restrict the movement of the linking portion 33 and at least one of the first stopper portion 31 and the second stopper portion 32 in the direction away from the first attachment member 11 in the second direction Y. Accordingly, the elastic stopper 30 may be prevented from separating from the first attachment member 11 in the second direction Y.

The second stopper portion 32 links ends in the second direction Y of the pair of the stopper walls 31*a*, making the elastic stopper 30 more compact.

The first restriction portion 35 includes the snap-fit protrusion 38 that penetrates at least one of the first stopper portion 31 and the second stopper portion 32 in the third direction Z and engages with and restricts movement in the third direction Z of at least one of the first stopper portion 31 and the second stopper portion 32.

Therefore, at least one of the first stopper portion 31 and the second stopper portion 32 may be reliably restricted from misalignment in the second direction Y with respect to the first attachment member 11. Further, the first restriction portion 35 and the second restriction portion 39 are able to restrict the snap-fit protrusion 38 from being pulled out of at least one of the first stopper portion 31 and the second stopper portion 32 in the third direction Z, even when the columns 31_b_ of the first stopper portion 31 are strongly pulled in the third direction Z.

Figure 4:
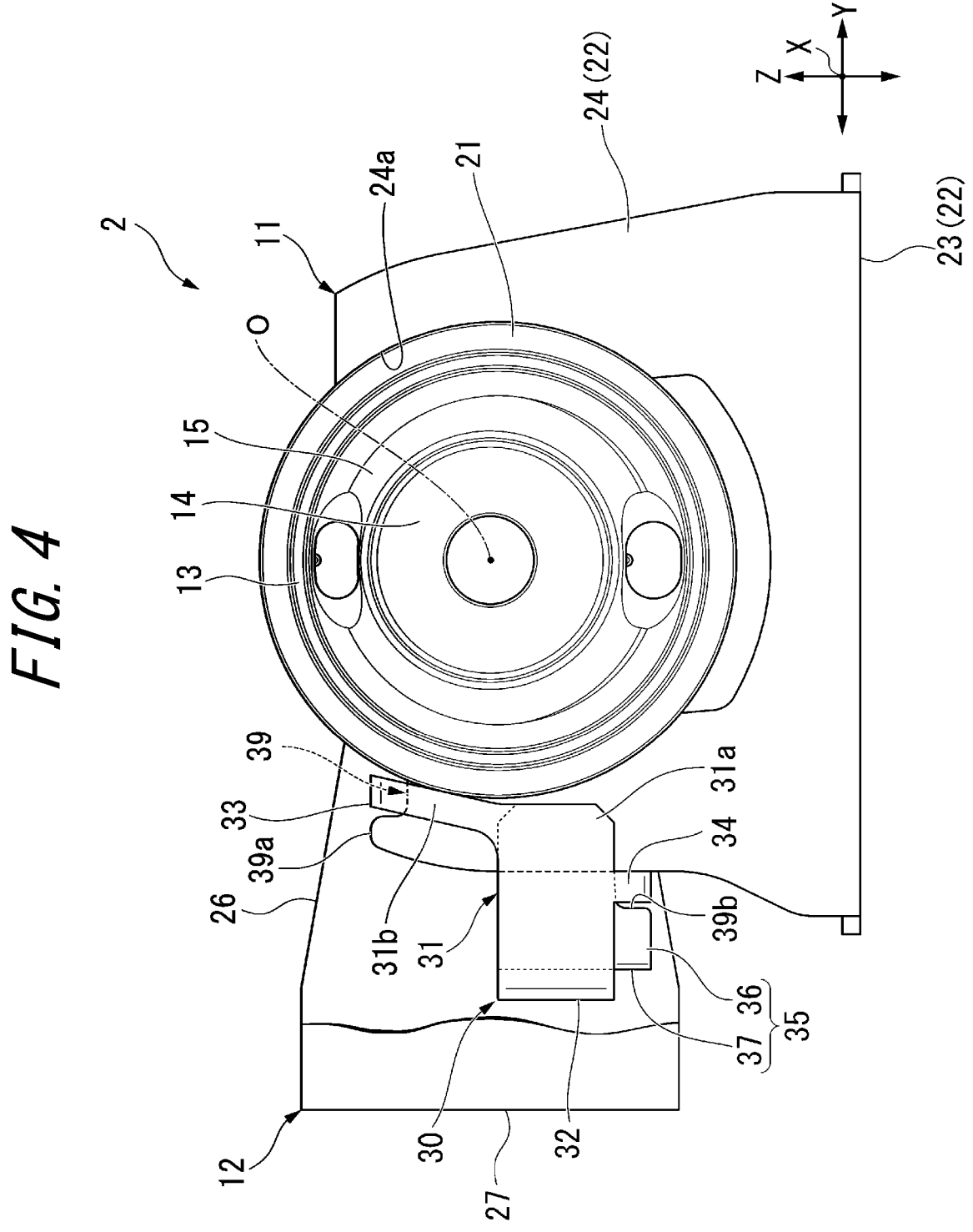
FIG. 4 is a side view of the vibration isolation device according to a second embodiment, viewed from the first direction.
Figure 5:
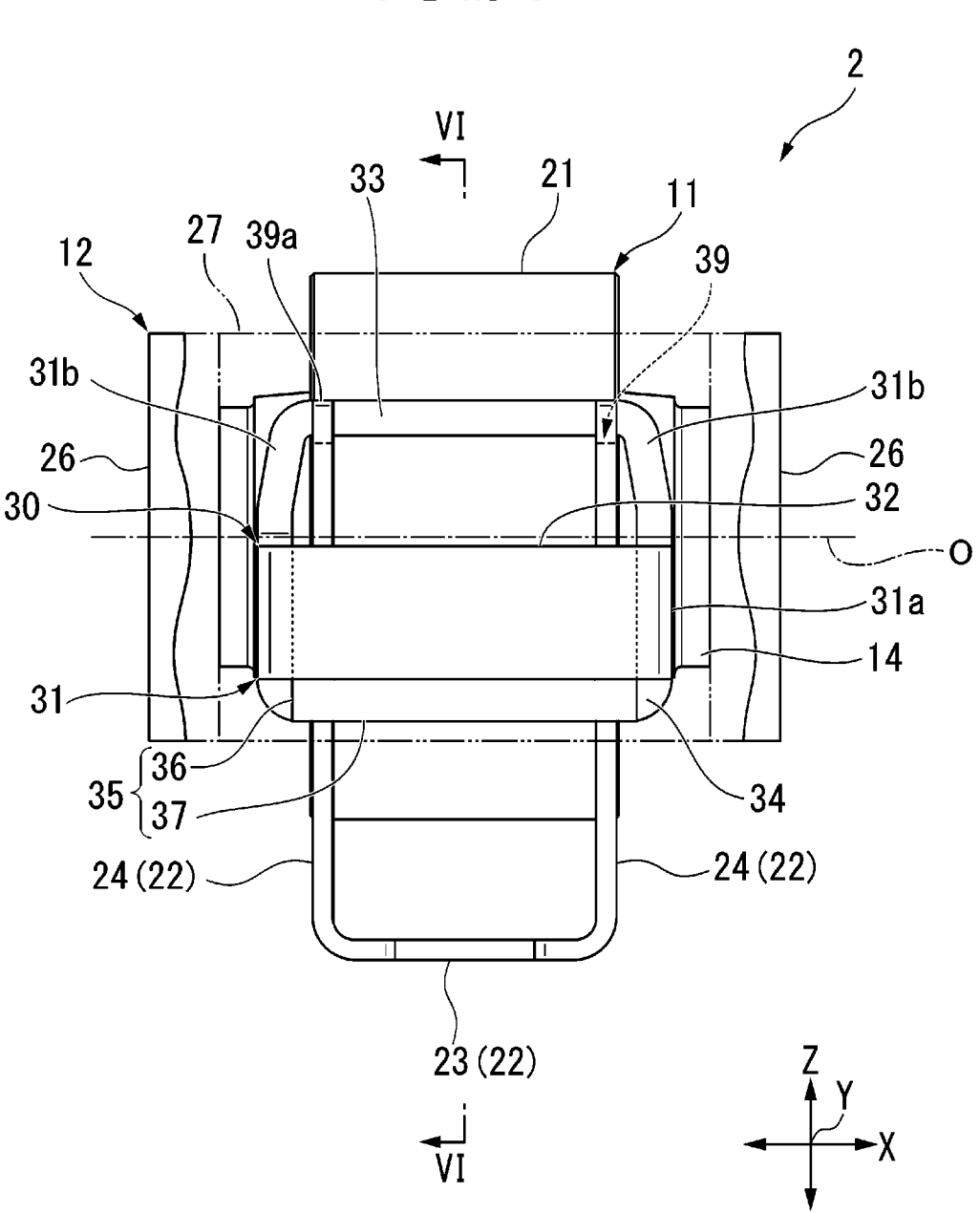
FIG. 5 is a side view of the vibration isolation device illustrated in FIG. 4, viewed from the second direction.
Figure 6:
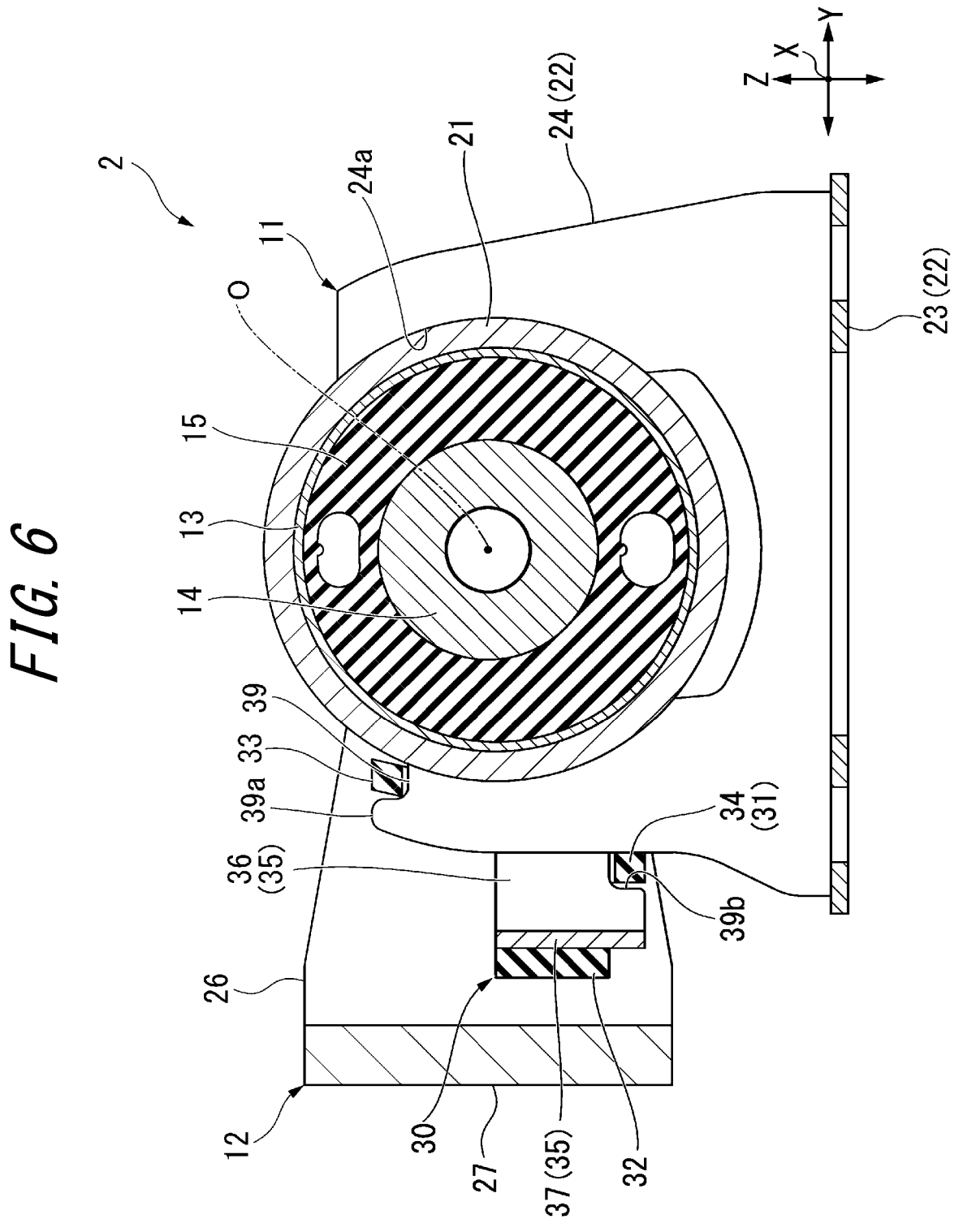
FIG. 6 is a view of a cross section indicated by the VI-VI line in FIG. 5.

Next, a vibration isolation device 2 according to a second embodiment of the present disclosure is described below with reference to FIG. 4 through FIG. 6.

In the description of the second embodiment, the same reference signs are assigned to parts that are the same as the components of the first embodiment, explanation thereof is omitted, and only points of difference are explained.

According to the present embodiment, the first restriction portion 35 is not provided with the snap-fit protrusion 38, and the bridging wall 34 is spaced away in the second direction Y inside direction from the second stopper portion 32. The lower ends of the third walls 36 and the fourth wall 37 of the first restriction portion 35 respectively protrude downward from the stopper walls 31_a_ and the second stopper portion 32.

Engagement recesses 39_b_ are formed in the third walls 36 of the first restriction portion 35, opening downward and in the second direction Y inside direction. The engagement recesses 39_b_ penetrate the third walls 36 in the first direction X. The engagement recesses 39_b_ are formed at the lower ends of the third walls 36. The bridging wall 34 is inserted into the engagement recesses 39_b_.

The bridging wall 34 is sandwiched in the second direction Y by the inner surfaces of the engagement recesses 39_b_ and the support plates 24, and is in direct contact with or close proximity to the inner surfaces of the engagement recesses 39_b_ and the support plates 24. Accordingly, the first restriction portion 35 restricts movement of the first stopper portion 31 away from the first attachment member 11 in the second direction Y.

Of the inner surfaces of the engagement recesses, the top surface of the bridging wall 34 is in direct contact with or close proximity to the top surfaces that face downward. Accordingly, the first restriction portion 35 engages with first stopper portion 31 and restricts upward movement of the first stopper portion 31.

As explained above, the vibration isolation device 2 according to the present embodiment, as with the previously-described embodiment, is able to accommodate multiple vibration input directions while minimizing an increase in the number of parts, and suppresses misalignment of the elastic stopper 30 with respect to the first attachment member 11 even without adhesion.

Further, the engagement recesses 39_b_ are formed in the third walls 36 of the first restriction portion 35, and the bridging wall 34 is inserted into the engagement recesses 39_b_. The top surface of the bridging wall 34 is in direct contact with or close proximity to the upper end surfaces of the engagement recesses 39_b_. Accordingly, the columns 31_b_ of the first stopper portion 31 may be reliably maintained in a state of strong tension in the third direction Z by the first restriction portion 35 and the second restriction portion 39.

The technical scope of the present disclosure is not limited to the embodiments described, and various modifications may be made without departing from the scope of the present disclosure.

For example, the first stopper portion 31 need not include the bridging wall 34.

The first restriction portion 35 and at least one of the first stopper portion 31 and the second stopper portion 32 may be configured to engage with at least one of the first stopper portion 31 and the second stopper portion 32 by provision of uneven portions or the like that engage with each other.

Other components of the embodiments described above may be replaced with known components to an extent that does not depart from the scope of the present disclosure, and the embodiments described above and variations may be combined as appropriate.

According to the vibration isolation device of the first aspect of the present disclosure, the elastic stopper includes the first stopper portion and the second stopper portion. Therefore, when vibrations are input to the vibration isolation device in the first direction and the second direction, the elastic stopper may collide with the second attachment member, allowing just one elastic stopper to accommodate multiple vibration input directions.

The first attachment member is provided with the pair of restriction portions that engage with the linking portion and at least one of the first stopper portion and the second stopper portion, and restrict the first stopper portion and the linking portion from approaching each other in the third direction. The portions of the first stopper portion connecting to the linking portion are tensioned in the third direction. Therefore, the elastic stopper may be tightened to the first attachment member in the third direction. Even without adhering the elastic stopper to the first attachment member, misalignment of the elastic stopper with the first attachment member may be suppressed when assembling into a vehicle, for example.

The first stopper portion, the second stopper portion, and the linking portion are formed as one integrated part, avoiding an increase in the number of parts.

In the vibration isolation device according to a second aspect of the present disclosure, also according to the first aspect, a first restriction portion of the pair of the restriction portions is in direct contact with or close proximity to at least one of the first stopper portion and the second stopper portion in the second direction, and a second restriction portion of the pair of the restriction portions is in direct contact with or close proximity to the linking portion in the second direction, and the pair of the restriction portions restricts movement of the linking portion and at least one of the first stopper portion and the second stopper portion away from the first attachment member in the second direction.

According to this configuration, the first restriction portion is in direct contact with or close proximity to at least one of the first stopper portion and the second stopper portion in the second direction, and the second restriction portion is in direct contact with or close proximity to the linking portion in the second direction. The first restriction portion and the second restriction portion restrict movement of the linking portion and at least one of the first stopper portion and the second stopper portion away from the first attachment member in the second direction. Therefore, the elastic stopper may be prevented from separating from the first attachment member in the second direction.

In the vibration isolation device according to a third aspect of the present disclosure, also according to the first aspect or the second aspect, the second stopper portion links ends in the second direction of the pair of the stopper walls.

According to this configuration, the second stopper portion links the ends in the second direction of the pair of the stopper walls, making the elastic stopper more compact.

In the vibration isolation device according to a fourth aspect of the invention, also according to any one of the first to third aspects, either one of the restriction portions includes a snap-fit protrusion protruding in the third direction and penetrating at least one of the first stopper portion and the second stopper portion in the third direction, and a tip of the snap-fit protrusion protruding in the third direction from at least one of the first stopper portion and the second stopper portion is configured to engage with and restrict movement in the third direction of at least one of the first stopper portion and the second stopper portion.

According to this configuration, one of the pair of the restriction portions includes the snap-fit protrusion that penetrates at least one of the first stopper portion and the second stopper portion in the third direction and engages with and restricts movement in the third direction of at least one of the first stopper portion and the second stopper portion. Therefore, at least one of the first stopper portion and the second stopper portion may be reliably restricted from misalignment in the second direction with respect to the first attachment member. Further, the pair of restriction portions are able to prevent the snap-fit protrusion from being pulled out of at least one of the first stopper portion and the second stopper portion in the third direction, even when the portions of the first stopper portion that connect to the linking portion are strongly pulled in the third direction.

INDUSTRIAL APPLICABILITY

According to the vibration isolation device of the present disclosure, multiple vibration input directions may be accommodated while minimizing an increase in the number of parts, and misalignment of the elastic stopper with respect to the first attachment member may be suppressed even without adhesion.

REFERENCE SIGNS LIST 1, 2 vibration isolation device
11 first attachment member
12 second attachment member
13 outer cylinder
14 inner cylinder
15 elastic body
26 first wall
27 second wall
30 elastic stopper
31 first stopper portion
31a stopper wall
32 second stopper portion
33 linking portion
35 first restriction portion (restriction portion)
38 snap-fit protrusion
39 second restriction portion (restriction portion)
X first direction
Y second direction
Z third direction

The invention claimed is:

1. A vibration isolation device comprising:
a first attachment member attached to either a vibration generator or a vibration receiver;
a second attachment member attached to the other of the vibration generator and the vibration receiver;
an outer cylinder attached to the first attachment member;
an inner cylinder attached to the second attachment member and inserted inside the outer cylinder;
an elastic body linking the inner circumferential surface of the outer cylinder and the outer circumferential surface of the inner cylinder to each other; and
an elastic stopper between the first attachment member and the second attachment member, wherein
the second attachment member comprises a pair of first walls covering the first attachment member from both sides in a first direction, and a second wall linking the pair of the first walls and covering the first attachment member in a second direction that intersects the first direction,
the elastic stopper comprising:
a first stopper portion that comprises a pair of stopper walls, one between the first attachment member and one of the first walls, and the other between the first attachment member and the other of the first walls; and
a second stopper portion between the second wall and the first attachment member, wherein
the stopper walls are linked in the first direction by the second stopper portion and a linking portion extending in the first direction,
the linking portion is spaced away from the second stopper portion in a third direction that intersects the first direction and the second direction,
the first stopper portion, the second stopper portion, and the linking portion are one integrated part,
the first attachment member is provided with a pair of restriction portions configured to engage with the linking portion and at least one of the first stopper portion and the second stopper portion, and restrict the first stopper portion and the linking portion from approaching each other in the third direction, and
portions of the first stopper portion connecting to the linking portion are tensioned in the third direction.

2. The vibration isolation device according to claim 1, wherein a first restriction portion of the pair of the restriction portions is in direct contact with or close proximity to at least one of the first stopper portion and the second stopper portion in the second direction, and a second restriction portion of the pair of the restriction portions is in direct contact with or close proximity to the linking portion in the second direction, and the pair of the restriction portions restricts movement of the linking portion and at least one of the first stopper portion and the second stopper portion away from the first attachment member in the second direction.

3. The vibration isolation device according to claim 1, wherein the second stopper portion links ends in the second direction of the pair of the stopper walls.

4. The vibration isolation device according to claim 1, wherein
either one of the restriction portions comprises a snap-fit protrusion protruding in the third direction and penetrating at least one of the first stopper portion and the second stopper portion in the third direction, and
a tip of the snap-fit protrusion protruding in the third direction from at least one of the first stopper portion and the second stopper portion is configured to engage with and restrict movement in the third direction of at least one of the first stopper portion and the second stopper portion.

5. The vibration isolation device according to claim 2, wherein the second stopper portion links ends in the second direction of the pair of the stopper walls.

6. The vibration isolation device according to claim 2, wherein
either one of the restriction portions comprises a snap-fit protrusion protruding in the third direction and penetrating at least one of the first stopper portion and the second stopper portion in the third direction, and
a tip of the snap-fit protrusion protruding in the third direction from at least one of the first stopper portion and the second stopper portion is configured to engage with and restrict movement in the third direction of at least one of the first stopper portion and the second stopper portion.

7. The vibration isolation device according to claim 3, wherein either one of the restriction portions comprises a snap-fit protrusion protruding in the third direction and penetrating at least one of the first stopper portion and the second stopper portion in the third direction, and a tip of the snap-fit protrusion protruding in the third direction from at least one of the first stopper portion and the second stopper portion is configured to engage with and restrict movement in the third direction of at least one of the first stopper portion and the second stopper portion.

8. The vibration isolation device according to claim 5, wherein either one of the restriction portions comprises a snap-fit protrusion protruding in the third direction and penetrating at least one of the first stopper portion and the second stopper portion in the third direction, and a tip of the snap-fit protrusion protruding in the third direction from at least one of the first stopper portion and the second stopper portion is configured to engage with and restrict movement in the third direction of at least one of the first stopper portion and the second stopper portion.

\*  \*  \*  \*  \*